Dec. 27, 1966    D. S. FRAZER ETAL    3,293,773
FREEZE DRYING APPARATUS

Filed Aug. 24, 1964    2 Sheets-Sheet 1

Douglas S. Frazer
Charles E. Bender
INVENTORS.

BY J. Walton Bader

ATTORNEY

United States Patent Office 3,293,773
Patented Dec. 27, 1966

3,293,773
FREEZE DRYING APPARATUS
Douglas S. Frazer and Charles E. Bender, New Paltz, N.Y., assignors to The Vir Tis Company, Inc., Gardiner, N.Y., a corporation of New York
Filed Aug. 24, 1964, Ser. No. 391,600
2 Claims. (Cl. 34—92)

This invention relates to a method of freeze drying and apparatus therefor and is particularly useful where material is being freeze dried which is freeze dryable to a granular form. Examples of such material would be vaccines, viruses, and other biologicals.

In the conventional method of freeze drying the material is placed within a container. The container is then closed. The material within the container is then shell frozen. The container is then placed in operative relationship with a source of vacuum. A refrigerated condensing system may optionally be employed to condense the water vapor. The vacuum and low temperature are continued until the freeze drying process is completed. The vacuum is then broken, the container opened, and the freeze dried material removed for further processing.

Conventionally, particularly where the freeze dried material is in granular form, the breaking of the vacuum causes a disturbance of the material in the container. As a result some of the material may be ejected from the container and lost. Also, in the conventional process, when the freeze drying process is almost completed, the material within the container, if it is in relatively light granular form, can be sucked into the vacuum producing member (such as a vacuum pump) and also lost.

Where the freeze dried material is valuable or where it is being used for analytical purposes even a slight loss of material can become very serious.

By means of the method and apparatus of this invennated. By the use of this invention the freeze dried material cannot be sucked into the vacuum producing means. Also, by reason of the construction herein, the breaking of the vacuum will be gentle and, in any event, will not disturb the material within the container.

The foregoing constitutes a brief description of the instant invention and the advantages thereof.

The invention will now be further described by reference to the accompanying drawings which are made a part of this specification.

FIG. 3 is a perspective view, on an enlarged scale, of an alternative type of filter means which may be utilized in connection with the apparatus of this invention.

Figure 1:
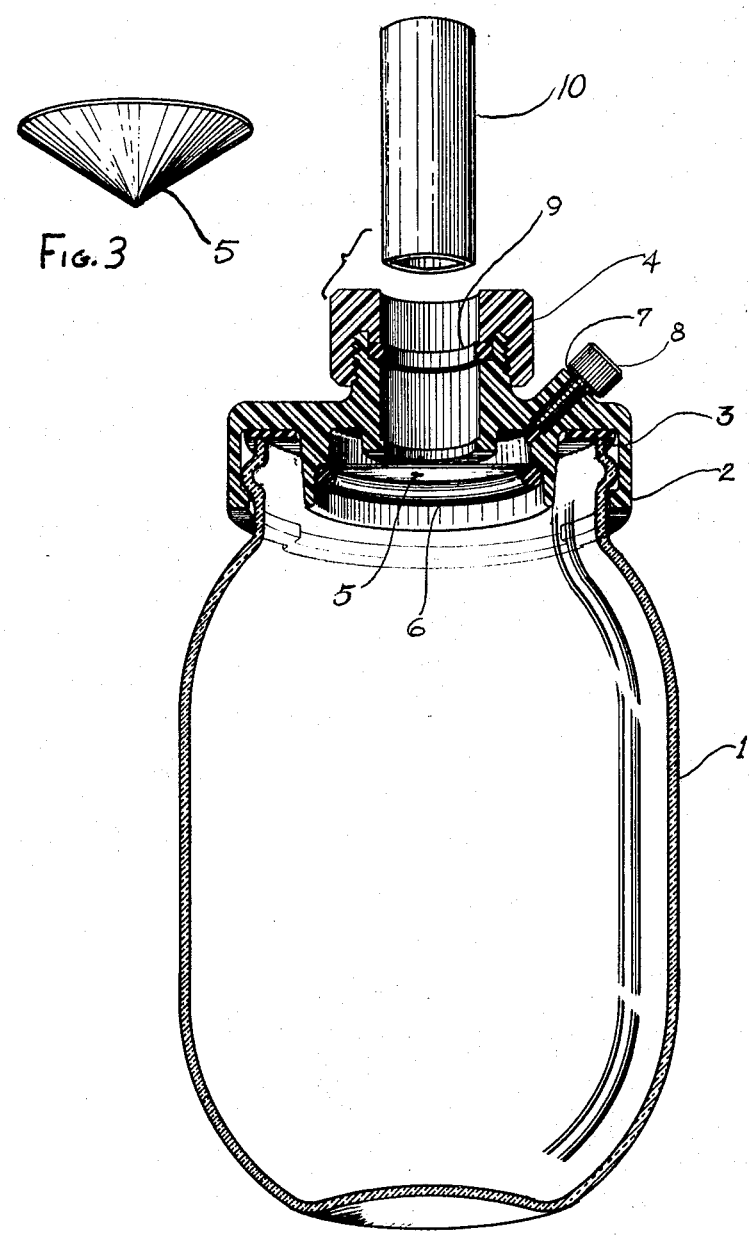
FIG. 1 is a partially exploded perspective view, looking at the apparatus with the container tipped upwardly, and with certain parts thereof in section so as to show the internal construction.
Figure 2:
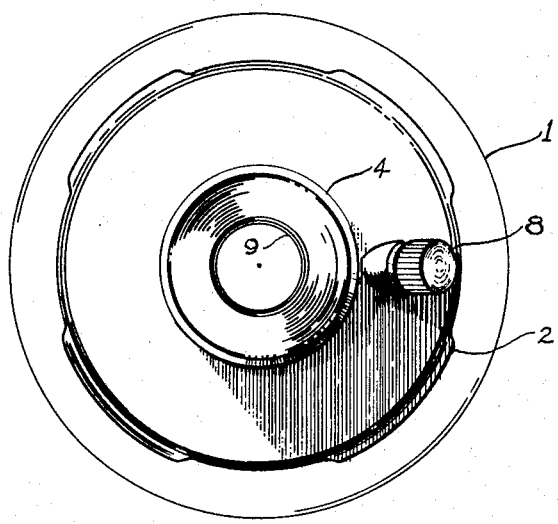
FIG. 2 is a top plan view of the apparatus shown in FIG. 1.

The invention will now be further described in detail by reference to the aforesaid drawings which represent the best modes known to the inventors of taking advantage of their invention. In this connection however, the reader is informed that the specific modifications and structures set forth in the instant specification are for illustrative purposes and for purposes of example only. Various changes and modifications could obviously be made without departing from the spirit and scope of this invention.

Now referring to the drawings in detail the apparatus of this invention comprises a container 1, which is preferably a glass bottle. A cover 2, preferably of unbreakable plastic material, is threadedly secured to the top of container 1. A sealing gasket 3 is provided between container 1 and cap 2.

A cap 4 is threadedly secured to the top of cover 2 and is provided with an opening therewithin which is in registration with a similar opening within cover 2. A filter 5 is disposed within the opening contained within cover 2 and is at least of equal diameter therewith. A ring member 6 is provided for sealing purposes and to retain filter 5 in position.

A vacuum release valve 8 is disposed within cover 2 and also bears a sealing gasket 7. An additional sealing ring 9, which is preferably made squared in cross section, is also provided. Sealing ring 9 abuts tube member 10 which in turn is adapted to be connected to a source of vacuum (not shown). The source of vacuum is conventional and consists of the conventional vacuum pump.

With the foregoing specific description the operation of this invention may now be explained.

Cover 2 is removed from container 1 and freeze dryable material (not shown) is placed within container 1. Cap 4 is removed from cover 2 and filter means 5 inserted within cover 2. Tube 10 is then inserted within the registering openings within cap 4 and cover 2 and cap 4 threadedly connected to cover 2 so as to secure tube 10 in position. Vacuum release valve 8 is closed.

The sample within the container is frozen and the entire apparatus is then connected to a source of vacuum (such as a vacuum pump). The container pressure is then lowered to at least one micron. The condensing system may also be operatively connected. The condensing system may be the conventional refrigeration system, Dry Ice bath, or the like. The freeze drying process is then commenced and the temperature lowered to at least 70° C. until the material within container 1 has been freeze dried. At this point vacuum release valve 8 is opened permitting a surge of air to enter container 1. However, since this valve is above filter 5 a violent surge of air is not caused to enter the container. Furthermore it is possible to open valve 8 gently.

During the course of the freeze drying process, if any material is sucked upwardly by the vacuum producing means the material will be stopped by filter 5. Hence none of the material that is being freeze dried is lost. If, in fact, some material has been trapped on filter 5, the material can be very easily recovered by merely removing it by conventional means which are well known in quantitative analysis procedures.

The foregoing description illustrates the manner in which the objects of this invention are achieved.

We claim:

1. A freeze drying apparatus comprising a container having a threaded circular top, a cover threadedly secured to said container provided with a circular vacuum connecting opening therewithin, a removable circular material impermeable filter of at least equal diameter to said vacuum connecting opening disposed thereupon, a vacuum release valve member within said cover and above said filter means, a cap above said cover and threadedly secured thereto provided with a circular opening in registration with said opening within said cover, a tube member within the openings within said cover and said cap, and sealing means intervening said tube member and said cover and cap.

2. A freeze drying apparatus comprising a container having a body portion formed with an open circular top portion having an outwardly projecting threaded flange thereupon, a sealing gasket above said opening, a cover partially above said sealing gasket normally overlying said open top and having a downwardly depending threaded portion overlying said flange, said downwardly depending portion having an inwardly extending portion normally underlying said flange, said cover also provided with a circular vacuum connecting opening therewithin, a ring member of smaller diameter than said vacuum connecting opening disposed thereabove, a removable conical material impermeable filter of at least equal base diameter to said vacuum connecting opening and extending therethrough, a threaded cap securing portion provided with an opening therewithin, upon said cover above said vacuum connecting opening, a cap provided with a mating opening and having a mating threaded portion thereupon normally secured to said cap securing portion, a conduit member secured within said openings within said cap and cap securing portion and a vacuum release valve member within said cover and above said filter means.

References Cited by the Examiner

UNITED STATES PATENTS

| | | | |
|---|---|---|---|
| 773,877 | 11/1904 | Lorillard | 34—92 |
| 1,151,417 | 8/1915 | Stokes | 34—92 |
| 2,307,802 | 1/1943 | Reichel | 34—5 |
| 2,477,044 | 7/1949 | Carmean | 34—92 |
| 2,742,709 | 4/1956 | De Woody | 34—92 |
| 3,009,258 | 11/1961 | Taylor | 34—92 |
| 3,088,219 | 5/1963 | Kraus | 34—92 |
| 3,165,386 | 1/1965 | Kapesker | 34—92 |

WILLIAM J. WYE, *Primary Examiner.*